April 18, 1961
G. W. HARRISON
2,979,807
METHOD OF MAKING A STRAIN GAGE
Filed March 4, 1958
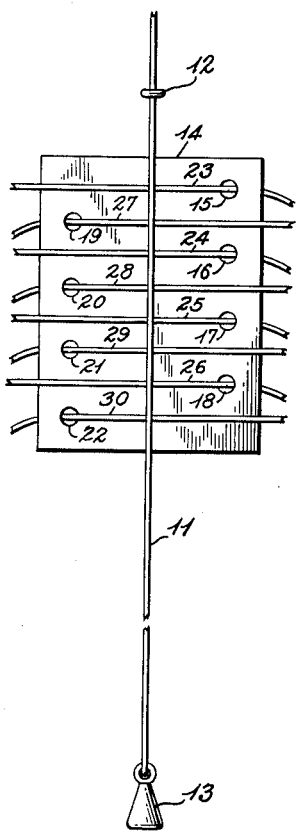
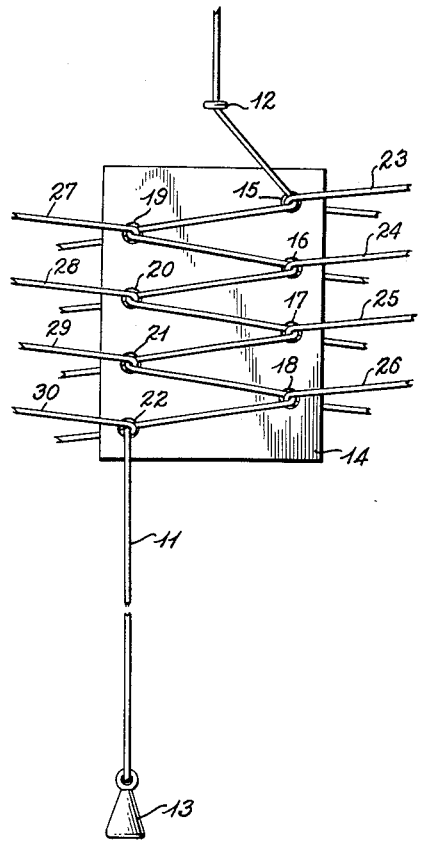
INVENTOR
George W. Harrison
BY Stevens, Davis, Miller & Mosher
ATTORNEYS

United States Patent Office 2,979,807
Patented Apr. 18, 1961

2,979,807

METHOD OF MAKING A STRAIN GAGE

George W. Harrison, Cumberland, Md., assignor to The Allegany Instrument Company, Inc., Cumberland, Md., a corporation of Maryland Filed Mar. 4, 1958, Ser. No. 719,168

2 Claims. (Cl. 29—155.62)

This invention relates to a strain gage patch which has the proper amount of tension on each strain winding wire and a method of making and winding such a strain gage patch.

The strain gage patches wound by the prior art methods varied greatly in their calibration. According to one of the conventional methods of the prior art strain gage patches were wound by using pins on a jig as the carrier for the strain wire. This process resulted in patches having different tensions in each winding and the calibration varied greatly from unit to unit. Also, the strain wire often broke when the patch was removed from the jig. The method and patch of the present invention was devised to overcome these difficulties.

According to the invention the strain wire is suspended with a weight to put the wire under a constant tension and the weighted strain wire is then laid on top of a previously formed pattern of parallel thread lengths, the alternate ends of which are laced through perforations in a paper Bakelite base of the strain gage patch and anchored. The threads are then alternately pulled back and fastened into position resulting in the product of the strain gage patch comprising the paper Bakelite base and the strain gage wire windings with predetermined tension on each winding.

One object of this invention is to provide a method of winding the strain gage patch which eliminates the customary jig with pins.

A further object of the invention is to provide a method which puts the proper amount of tension on the strain wire.

A further object of the invention is to provide an improved and cheaper method of making strain gage patches.

A further object of the invention is to provide a method of winding a strain gage patch which will produce patches having consistently the same calibration.

A further object of this invention is to provide a strain gage patch which has the proper amount of tension prestressed into the strain wire.

A further object of this invention is to provide an improved and less expensive strain gage patch.

A further object of this invention is to provide a strain gage patch having a predetermined calibration.

The objects and advantages of this invention can be better understood with reference to Figures 1 and 2, which illustrate the steps of making the strain gage patch, according to the present invention. Figure 1 shows a preliminary phase of the method and Figure 2 shows a final phase of the method.

To make the strain gage patch a large piece of paper is impregnated with Bakelite and semi-cured. Besides Bakelite, which is the preferred material, any cement or other bonding material that has the proper characteristics for strain gage work can be used. The large sheet of Bakelite is cut into pieces slightly larger than the final size. One of these pieces is designated in Figures 1 and 2 by the reference numeral 14. The patch 14 in perforated to form a column of holes 19 through 22 on one side and a second column of holes 15 through 18 on the other side. The holes 15—18 are at alternate levels with the holes 19—22 so that there is only one hole at each level. A plurality of threads 23 through 26 are threaded through the holes 15 through 18 respectively and a second plurality of threads 27 through 30 are similarly threaded through the holes 19 through 22 respectively. The paper base 14 is taped to a horizontal surface by placing strips of tape, such as Scotch tape, along the two edges of the paper containing the holes 15—18 and 19—22 but not covering these holes. This operation serves not only to fasten the paper down but also anchors the end of each thread that goes through the respective hole. The other end of the thread is left free. The threads 27 through 30 are then positioned to lay parallel to one another extending across the base 14 from the holes 19 through 22 as shown in Figure 1. Likewise, the threads 23 through 26 are positioned to lay parallel to one another extending across the base 14 from the holes 15 through 18 with the free ends of threads 23 through 26 extending in the opposite direction from the free ends of threads 27 through 30. A strain wire 11 is fastened to the horizontal surface at the position indicated by the reference numeral 12 by means of tape or other fastening means and placed over the thread pattern. A tensioning weight 13 is attached to the wire 11 and permitted to hang free over the edge of the horizontal surface to provide a predetermined tension to the strain wire 11. The first thread 23 is then pulled to the right drawing the strain wire 11 to the hole 15 so that the thread 23 is in the position shown in Figure 2. The thread 23 is then fastened there by a piece of tape to retain a small section of the wire at the hole 15. At this point of the operation the weight 13 is suspended from the thread 23 at the hole 15. Next, the thread 27 is pulled to the left drawing the part of the strain wire 11 between the thread 23 and the weight 13 to the hole 19 so that both the threads 27 and 23 are in the position shown in Figure 2. The thread 27 is fastened in this position by a piece of tape to retain another small section of the wire 11 at the hole 19. During this operation the part of the wire 11 between the thread 23 and thread 27 is put under a predetermined tension determined by the weight 13. At this point of the operation the weight 13 will be suspended from the thread 27 at the hole 19. Next, the thread 24 is pulled to the right drawing the strain wire 11 to the hole 16 so that the threads 24, 27, and 23 are all in the position shown in Figure 2. The thread 24 is fastened in this position by a piece of tape to retain another small section of the wire 11 at the hole 16. During this operation the part of the strain wire 11 between thread 24 and the thread 27 is put under a predetermined tension by the weight 13. Each of the threads 28, 25, 29, 26 and 30 are successively drawn to the right and left and fastened in a similar operation and in that order thus producing the zig-zag configuration of strain wire shown in Figure 2. The tapes used to fasten the threads in the position shown in Figure 2 are placed so as not to interfere with the subsequent operations to be described below. The tensions on the parts of the strain wire between the threads are equal to each other predetermined by the constant force applied to the wire 11 by the weight 13. The next step of the operation is to cover the whole paper 14 with Bakelite. One strip of paper impregnated with semi-cured Bakelite is then laid on each side of the patch between the holes and the edge of the paper to fasten the thread ends during subsequent curing and mounting operations. The patch is placed between two 3/16 inch thick steel plates which are separated from the patch by 1/16 inch of rubber, which in turn is separated from the patch by sheets of a tetrafluoroethylene polymer, which is sold under the trade name of Teflon. The assembly of the steel plates, rubber, Teflon, and the patch is then clamped. This assembly is placed in an oven and the new Bakelite is semi-cured. After curing the patch is separated from the Teflon rubber and steel plates and the threads are trimmed back to the edge of the patch. The Teflon is used to keep the rubber from sticking to the patch during the curing opeartion. The Teflon is stripped quite easily from the patch.

The resulting strain gage patch made by the above described method has no cover paper since the semi-cured Bakelite will hold the strain wire in place on the base during mounting and it is desirable that the strain wire be separated by as little material as possible from the insulated strain surface. The Bakelite in the strain gage is only semi-cured as the final curing takes place when the patch is mounted. The degree of curing of the Bakelite depends upon the final curing temperature and the time during which it is held at this temperature. Such semi-cured patches are known by the trade as "green" gages. The strain wire of the patch will have a stress predetermined by the weight 13. Each strain gage patch thus produced will have approximately the same calibration if the number of turns, the pitch of the winding, the width of the winding, and the weight 13 are kept constant and the same type wire is used. Consequently, the calibration of the strain gage patch can be predetermined.

It is understood that the number of perforations shown is for illustration only and could be increased at will to give the desired number of windings to the strain gage patch. These and other modifications are considered to come within the spirit and scope of the invention which is to be limited only as defined in the appended claims.

I claim:

1. A method of making a strain gage comprising the steps of providing a non-metallic strain gage patch, perforating two columns of holes in the strain gage patch, passing a separate thread through each hole and extending the threads across the surface of the strain gage patch, placing a strain gage wire over the threads, suspending a weight by said strain gage wire, drawing the wire to the respective holes with the threads by looping the threads to retain a small section of the wire at each hole, and bonding the wire to the patch while it is retained by the threads, the drawing and retaining operation being performed on each thread in succession starting with the thread in the top perforation of one of the columns and then taking the rows in order while alternating between the columns.

2. A method of making a strain gage comprising the steps of providing a non-metallic strain gage patch, perforating two columns of holes in the strain gage patch, passing a separate thread through each hole and extending the threads across the surface of the strain gage patch, placing a strain gage wire over the threads, suspending a weight by said strain gage wire, fastening one end of each thread to the patch, drawing the wire to the respective holes with the threads by looping the other end of each thread over the strain gage wire and retaining a small section of the wire at each hole by applying a bonding material to the strain gage patch, the drawing and retaining operations being performed on each thread in succession starting with the thread in the top perforation of one of the columns and then taking the rows in order while alternating between the columns, and fastening the other end of each thread to the patch after drawing the wire to the respective holes with the threads.

References Cited in the file of this patent

UNITED STATES PATENTS

| | | |
|---|---|---|
| 2,388,966 | Harrison | Nov. 13, 1945 |
| 2,448,217 | Gonsalves | Aug. 31, 1948 |
| 2,626,337 | Mitchell | Jan. 20, 1953 |
| 2,698,371 | Li | Dec. 28, 1954 |
| 2,731,707 | Pulliam | Jan. 24, 1956 |
| 2,746,129 | Christensen | May 22, 1956 |
| 2,885,524 | Eisler | May 5, 1959 |